United States Patent [19]

Connell

[11] Patent Number: 5,581,625
[45] Date of Patent: Dec. 3, 1996

[54] STEREO VISION SYSTEM FOR COUNTING ITEMS IN A QUEUE

[75] Inventor: Jonathan H. Connell, Cortlandt-Manor, N.Y.

[73] Assignee: International Business Machines Corporation, Armonk, N.Y.

[21] Appl. No.: 189,561

[22] Filed: Jan. 31, 1994

[51] Int. Cl.⁶ .......................................... G06K 9/00
[52] U.S. Cl. ..................... 382/1; 382/106; 382/154; 348/42; 348/139; 348/142; 348/143; 356/3; 356/12; 359/462; 359/458; 359/466; 359/468
[58] Field of Search .................... 382/1, 106, 154; 250/341.1, 306; 358/88, 108; 365/5; 128/664; 356/3, 12; 359/462, 458, 466, 468; 348/139, 142, 42, 51, 135, 154, 143

[56] References Cited

U.S. PATENT DOCUMENTS

| | | | |
|---|---|---|---|
| 3,811,010 | 5/1974 | Long | 178/6.8 |
| 4,234,241 | 11/1980 | Schmidt | 350/6.9 |
| 4,303,851 | 12/1981 | Mottier | 235/92 |
| 4,601,053 | 7/1986 | Grumet | 382/1 |
| 4,631,580 | 12/1986 | Taube et al. | 358/88 |
| 4,637,055 | 1/1987 | Taylor | 382/31 |
| 4,654,872 | 3/1987 | Hisano et al. | 382/1 |
| 4,723,159 | 2/1988 | Imsand | 348/42 |
| 4,799,243 | 1/1989 | Zepke | 377/6 |
| 4,939,439 | 7/1990 | Dalglish | 348/135 |
| 5,003,166 | 3/1991 | Girod | 382/1 |
| 5,065,236 | 11/1991 | Diner | 358/88 |
| 5,097,328 | 3/1992 | Boyette | 358/108 |
| 5,121,201 | 6/1992 | Seki | 358/108 |
| 5,130,794 | 7/1992 | Ritchey | 358/87 |
| 5,138,638 | 8/1992 | Frey | 377/6 |
| 5,142,357 | 8/1992 | Lipton et al. | 358/88 |
| 5,150,382 | 9/1992 | Kume | 375/88 |
| 5,182,776 | 1/1993 | Suzuki et al. | 348/143 |
| 5,213,105 | 5/1993 | Gratton et al. | 138/664 |
| 5,298,697 | 3/1994 | Suzuki et al. | 348/135 |
| 5,371,536 | 12/1994 | Yamaguchi | 348/143 |

FOREIGN PATENT DOCUMENTS

| | | | |
|---|---|---|---|
| 1-93985 | 4/1989 | Japan | H04N 13/02 |
| 3-212610 | 9/1991 | Japan | G02B 23/24 |
| WO92/11735 | 7/1992 | WIPO | H04N 13/04 |

OTHER PUBLICATIONS

Bantz, D. F. and Evangelisti, C. J., "Device for Creating 3D Video Effect by Parallax", IBM Technical Disclosure Bulletin, vol. 20, No. 5, Oct. 1977.

Primary Examiner—Jose L. Couso
Assistant Examiner—Anh Hong Do
Attorney, Agent, or Firm—Heslin & Rothenberg, P.C.; Wayne F. Reinke

[57] ABSTRACT

A number of items present in a substantially linear queue are counted by examining two images of a scene including the queue that are taken from vantage points offset relative to each other. Depth information for portions of the scene is obtained by correlating equal sized patches in the images at a predetermined number of offsets, since closer objects will require more of an offset to align one image relative to the other than objects further away from video cameras creating the two images. A match score is determined at each offset. The best offset and the number of offsets to achieve it are stored for each patch. A plot is then created for offsets versus the number of patches at each offset having the best match. Peaks in the plot indicate the number of objects in the queue.

30 Claims, 11 Drawing Sheets

6,581,625

STEREO VISION SYSTEM FOR COUNTING ITEMS IN A QUEUE

BACKGROUND OF THE INVENTION

1. Technical Field

The present invention generally relates to counting systems. More particularly, the present invention relates to determining the number of items in a linear queue.

2. Background Art

Tracking the number of items in a queue is done in many different circumstances. For example, the number of people in a line or queue waiting to purchase goods or to otherwise be serviced. As a more specific example, retail stores monitor cashier check-out lines and open more registers when the lines get too long. Keeping lines short helps avoid the loss of customers due to the wait and may discourage shoplifting as a method of avoiding the long lines.

Monitoring the length of lines of people waiting becomes even more important when one considers broader uses for this information. On a long-term basis, data regarding lines can be used to identify periods of higher and lower activity, in order to more effectively schedule the number of cashiers or other service people. The information could also indicate store locations in a chain of stores (or departments within a store) with poor customer service as indicated by consistently long lines. Further, the information could be combined with cash register receipts to determine an average number of people per purchasing group. Registers could be opened when a certain number of these statistical purchasing groups are in line.

In the past, the monitoring of lines of people waiting has been done in a variety of ways, all of which suffer from various inefficiencies. Such monitoring is often done visually by an employee. However, this prevents that employee from doing other more critical jobs and becomes increasingly difficult to manage as the number of customers and/or lines increases. Another way line monitoring is done is electronically. One system employs a pressure-sensitive mat with active areas and counts the number of areas currently having sufficient weight thereon. However, each person would have to be directly on one of the areas, rather than to one side, and the mats may wear out over time. Another electronic approach is to use break-beam type sensors which monitor for breaks in the light beam when people enter and exit the queue; the difference between the entrance and exit count being the number of people currently in the line. However, this requires physical delimitation of a line, two people close together when entering or exiting could be counted as one and children may fidget near the beam causing it to trigger repeatedly.

Thus, a need exists for an efficient, flexible system to monitor the number of people (or more generally, objects) in a line or queue.

SUMMARY OF THE INVENTION

Briefly, the present invention satisfies the need for an efficient, flexible system for counting objects in a line or queue by providing method and apparatus for determining same from an examination of stereo images of a scene including the objects.

In a first aspect of the invention, a method for counting a plurality of objects currently present in a substantially linear queue is provided. A stereo image of a scene including the queue is first obtained from a vantage point area in close proximity to one end of the queue. Depth information is then obtained from the stereo image for portions of the scene relative to the vantage point. The depth information is then interpreted to determine areas of the stereo image substantially corresponding to a given depth range, each of the plurality objects corresponding to a particular determined area.

Where each of the plurality of objects in the scene are offset in a first image and second image comprising the stereo image, the step of obtaining depth information may comprise correlating patches in the first and second images. A plot of depth frequency for the correlated patches may then be created, from which peaks therein may be determined, each of the plurality of objects in the queue corresponding to one of the determined peaks.

The correlation of a given patch of predetermined size in the first image with a patch of that same size in the second image may be accomplished by initially superimposing the first and second images. A correlation indicator is then determined for the patch in the first image relative to the patch in the second image, the correlation indicator indicating how well the patches match. The images are then shifted relative to each other and a correlation indicator is again determined for the given patch relative to a different patch of the same size in the second image lined up therewith. The shifting and determining is repeated for a predetermined number of times, storing the best correlation indicator and the corresponding number of shifts to achieve same. A plot may then be created of shifts versus a number of patches at each shift for which that shift provided the best match. Each of the objects in the queue corresponds to a peak in the plot. Thus, peaks in the plot are examined to determine the number of objects in the queue.

In a second aspect of the invention, apparatus for counting a plurality of objects currently present in a substantially linear queue is provided. The apparatus comprises means for obtaining a stereo image comprising a pair of images of a scene including the queue, means for correlating patches of the images to determine depths for corresponding areas of the scene relative to the obtaining means and means for obtaining depth frequency information for the correlated patches from which the plurality of objects may be counted.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
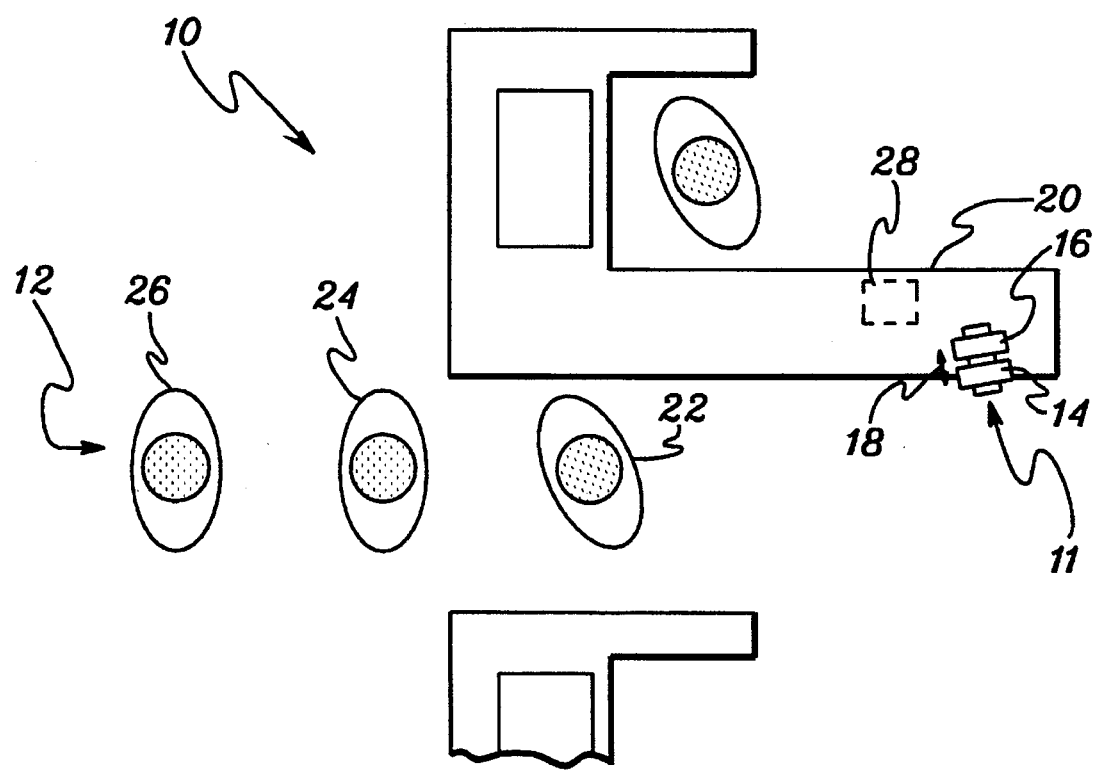
FIG. 1 depicts a top view of a stereo video camera set up at a cashier check-out queue in accordance with the present invention.

FIG. 1 is a top view 10 of a stereo video camera 11 at a cashier check-out queue 12 in accordance with the present invention. Left video camera 14 and right video camera 16, parallel and separated by a distance 18, comprise stereo video camera 11. Stereo camera 11 rests above counter 20 and is aimed at people 22, 24 and 26 in queue 12 and preferably placed just above eye level and off to one side of the center of the queue. Given this set-up, the number of people currently in queue 12 can be determined with the help of processor 28, shown in shadow, under counter 20.

An overview of the process by which the number of people currently in queue 12 is determined according to the present invention will now be given. In the simplest form, two images are produced from cameras 14 and 16 of the scene including people 22, 24 and 26 in queue 12. Items in the two images, due to separation distance 18, will be shifted relative to each other to some degree, depending on the distance from the cameras. Things farther away from cameras 14 and 16 will be less shifted in the two images than closer ones. The two images are superimposed to determine if a given predetermined sized patch in, for example, the bottom image matches up with the same size patch in the top image directly thereabove. The images are then shifted relative to each other by, for example, a single pixel and the given patch is compared again. This process continues for a predetermined number of shifts of increasing size. Then, another patch is used in the comparison process. For each patch, the best match and the corresponding number of shifts to achieve same are noted. From this information, a depth graph can be created plotting the number of shifts against the number of patches (or pixels) for whom each shift was the best match. If a reference depth graph is made with no people standing in queue 12, a graph with people in queue 12 can be compared thereto to eliminate stationary objects and/or background that may otherwise be interpreted as people. Eliminating peaks found in the reference depth graph, peaks in a given depth graph are counted; each peak corresponding to a person.

The above process will now be described in detail in the context of a queue of people waiting for a cashier. The separation distance between the cameras depends on the field of view of the cameras (the cameras are assumed to be identical), the expected distance of the farthest person in the queue, the expected separation between people in the queue and the number of pixels in a given row of either of the two images produced. More specifically, the optimum separation distance "s" between the cameras can be found using the following equation:

$$s = (F \cdot d \cdot (d-\delta))/(p \cdot \delta),$$

where:

F=field of view of each camera in radians (for example, a 15 degree or 0.26 radian cone with the tip at the camera would be able to image a 5 foot wide object at 20 feet);

d=the shortest linear distance from one camera to the farthest expected person in the queue;

δ=the expected distance between people in the queue; and p=the number of pixels in a row of the image.

As an example, with a maximum distance of 20 feet, an expected distance between people of 2 feet, a field of view of 0.26 radians and a row pixel count of 110, the separation distance would be approximately 5 inches.

Once a pair of images comprising a stereo image are obtained, they are compared against each other to obtain depth data to create a depth graph from which peaks may be examined to determine the number of people currently in the queue. The term "stereo image" as used herein refers to an image made up of multiple images of the same area of interest in a scene, a queue in the present embodiment, offset relative to each other. In the present exemplary embodiment, the two images are offset horizontally relative to each other. A depth graph is ideal for counting items in such a queue, since accidental movement of the cameras by a few degrees will not affect the depth of objects in the scene relative to the cameras, however, a new reference graph may be needed. A pixel patch of size h by v, centered on coordinates x,y, is chosen in one image for comparison with equal sized patches in the other image. For optimum results, a given patch should have a large scale texture; that is, a gradation in color or in light to dark. For each patch comparison, a match score is computed using the following equation, commonly known as normalized correlation:

$$\text{score}(x,y) = \frac{E_{x,y}(\text{left,right}) - E_{x,y}(\text{left})E_{x,y}(\text{right})}{\sigma_{x,y}(\text{left})\sigma_{x,y}(\text{right})}, \quad (1)$$

where:

$$\sigma_{x,y}(\text{image}) = [E_{x,y}(\text{image}^2) - (E_{x,y}(\text{image}))^2]^{1/2}; \quad (2)$$

$$E_{x,y}(\text{image}) = \quad (3)$$

$$\frac{1}{hv} \sum_{dy=-v/2}^{v/2} \sum_{dx=-h/2}^{h/2} \text{image}(x+dx, y+dy);$$

$$E_{x,y}(\text{image}^2) = \quad (4)$$

$$\frac{1}{hv} \sum_{dy=-V/2}^{V/2} \sum_{dx=-h/2}^{v/2} (\text{image}(x+dx, y+dy))^2; \text{ and}$$

$$E_{x,y}(\text{left right}) = \quad (5)$$

$$\frac{1}{hv} \sum_{dy=-v/2}^{v/2} \sum_{dx=-h/2}^{h/2} \text{left}(x + dx, y+dy)\text{right}(x+dx, y+dy).$$

The above match score equation is relatively insensitive to small variations in overall intensity between the two images and does not require the extraction and matching of features such as edges.

Equation (2) above gives the standard deviation of brightness values (typically ranging from 0 to 255) in a pixel patch of size h by v and centered on x,y, where the origin for X and Y pixel coordinates is at the top left of the image. Equation (3) gives the average brightness of the patch centered on x,y and of size h by v. The term after the summation signs in equation (3) is the brightness value at the coordinates x+dx,y+dy. Equation (4) gives the average brightness value for the squares of the pixel brightnesses in the patch. Finally, equation (5) gives the average brightness for a patch created by multiplying the left image brightness for pixels in a given patch by the corresponding right image pixel brightness. The first and second terms after the summation signs in equation (5) are the pixel brightness in the left and right images, respectively, at the coordinates x+dx, y+dy.

The images are initially lined up and a match score is computed and stored for the chosen patch. Next, the images are shifted by, for example, one pixel horizontally and the match score is again computed. The new match score is compared with the previously stored match score and replaced if the new match score is higher, indicating a higher correlation. The shifting, match score computing and match score comparing are repeated for a predetermined number of increasingly larger shifts, for example, twenty shifts, to determine the best match for that given patch. Another patch is chosen and the matching process is repeated, until all patches desired to be matched are exhausted.

Figure 2A:
FIG. 2a is a still photo of a scene taken by the left camera in a real world set-up as depicted in FIG. 1.
Figure 2B:
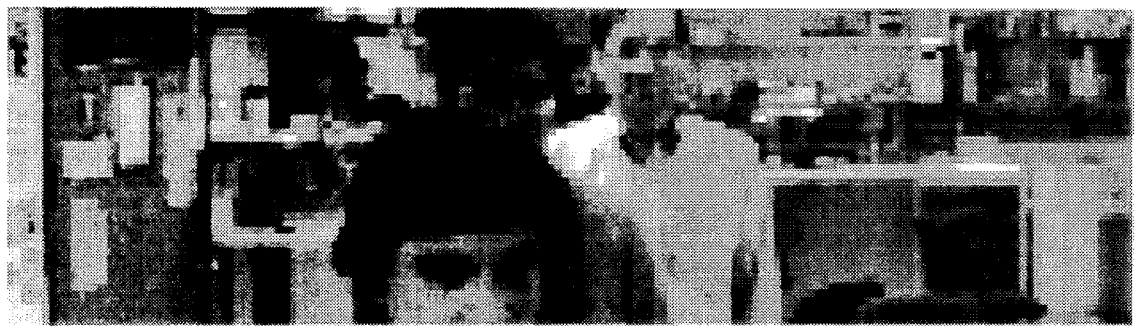
FIG. 2b is a still photo of the scene of FIG. 2a taken by the right camera.

FIGS. 2a and 2b are video images from cameras 14 and 16, respectively, showing a queue for a cashier (not shown) in a retail store. Notice that each of the three people in FIG. 2a is offset to some degree with respect to their location in FIG. 2b. This offset is due to the separation of cameras 14 and 16.

Figure 3:
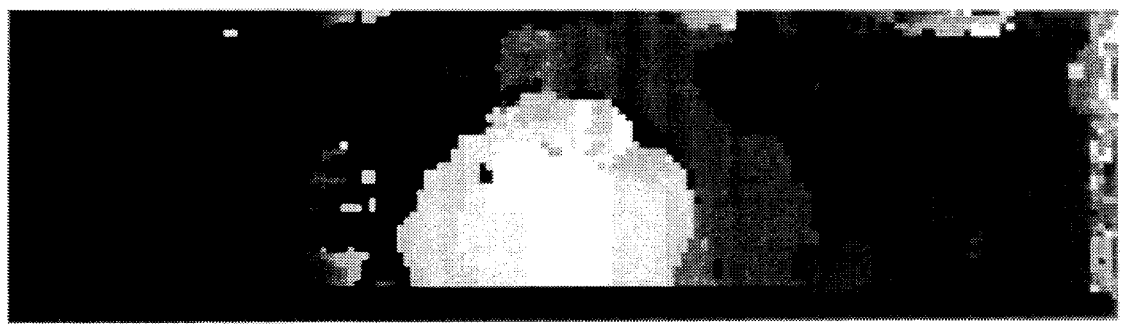
FIG. 3 is a pseudo image or depth map of the scene of FIGS. 2a and 2b compiled from depth information, where brighter colors correspond to closer objects and darker colors correspond to objects farther away.

FIG. 3 is a pseudo image of the scene of FIGS. 2a and 2b compiled from the match score and shifting information, where brighter colors correspond to closer objects (best match score occurred after a relatively large number of shifts) and darker colors correspond to objects farther away (best match score occurred after a relatively small number of shifts). The image of FIG. 3 roughly outlines the major objects found in the scene of FIGS. 2a and 2b. Although rough, the pseudo image of FIG. 3 provides enough clarity to delineate larger objects therein, such as people.

Figure 4:
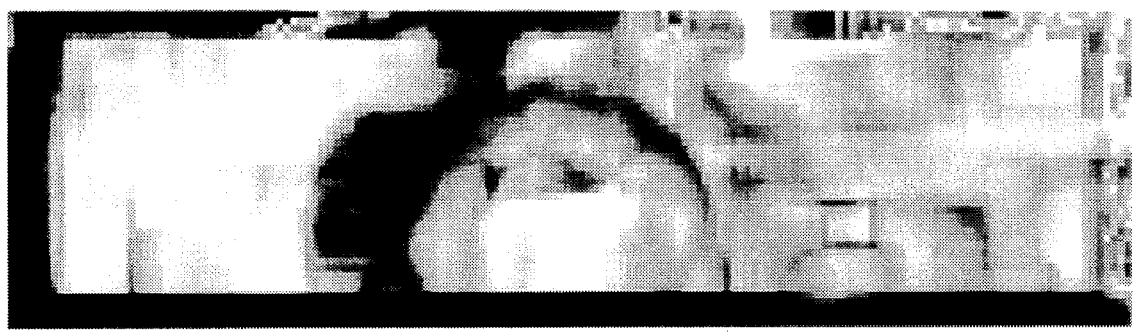
FIG. 4 visually indicates confidence levels regarding depths shown in FIG. 3, where brighter colors correspond to areas of higher confidence relative to areas shown in darker colors.

FIG. 4 is a pseudo image of the scene of FIGS. 2a and 2b, constructed from the highest saved match score for each pixel patch. The higher the best match score is for a given patch, the brighter the color will be for that patch, with relatively lower scores corresponding to darker colors. Notice that the majority of FIG. 4 comprises bright colors, indicating that the depth estimates in those areas are believed to be accurate. The white objects to the left of the closest head in the foreground of FIG. 2a are occluded by that head in FIG. 2b; thus, this area is "unknown" or black in FIG. 4.

Figure 5:
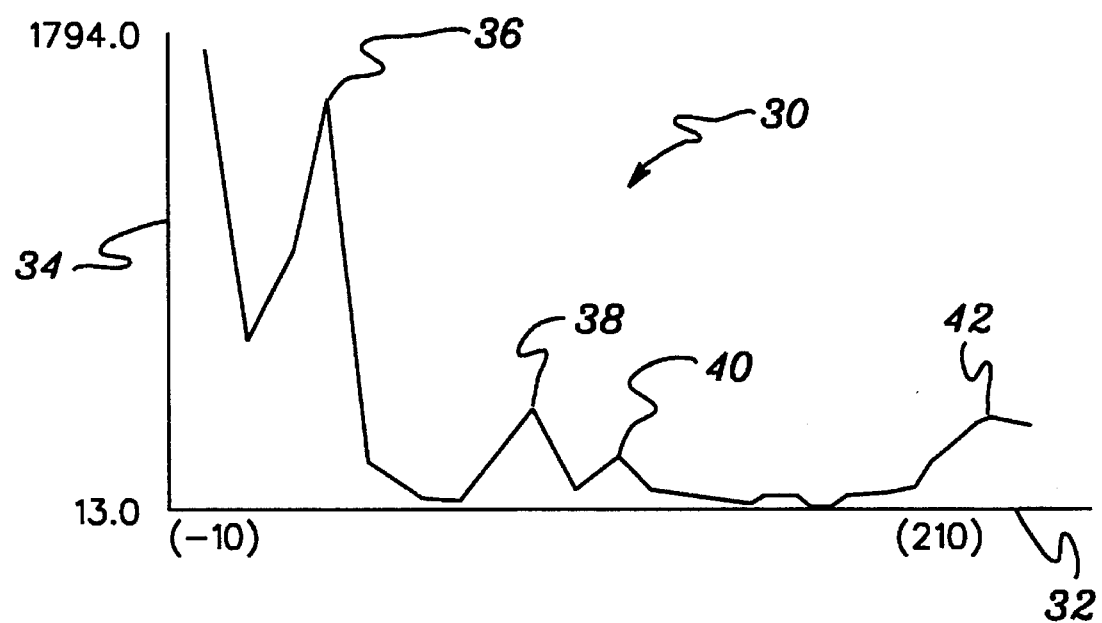
FIG. 5 is a graph of all valid depth readings comprising the depth map of FIG. 4.

FIG. 5 is a graph 30 of all valid depth readings shown visually in FIG. 3. In the present exemplary embodiment, match scores of 0.8 or higher are considered to be valid. However, it will be understood that a "valid" match score may be different in different situations. The graph plots shift number on the X axis 32 against pixels on the Y axis 34, providing the number of pixels at a given shift having their highest match score. The large peak 36 at the left corresponds to the background, which is verified with a reference depth graph (not shown) with no people in the queue. Peak 38 in graph 30 represents the farthest person in the queue relative to the cameras, peak 40 the middle person and peak 42 the closest person. In order to avoid misinterpreting a peak as a person in the queue, portions of graph 30 also found in a reference depth graph could be eliminated or subtracted out.

Figure 6A:
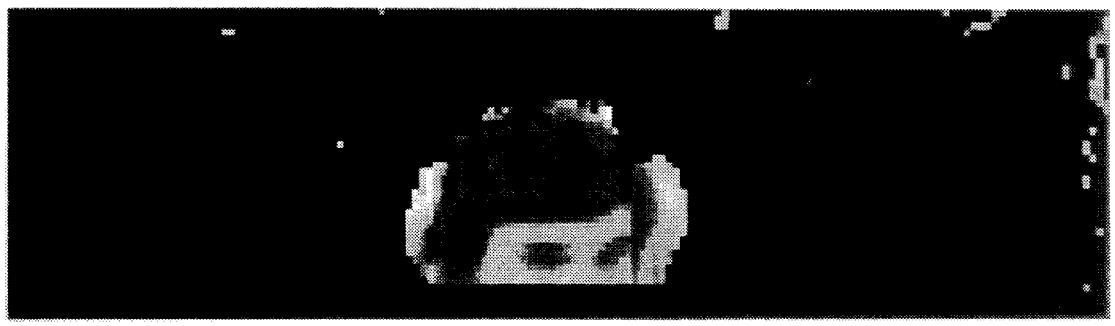
FIG. 6a is a portion of the scene of FIGS. 2a and 2b corresponding to the right-most peak in the graph of FIG. 5.
Figure 6B:
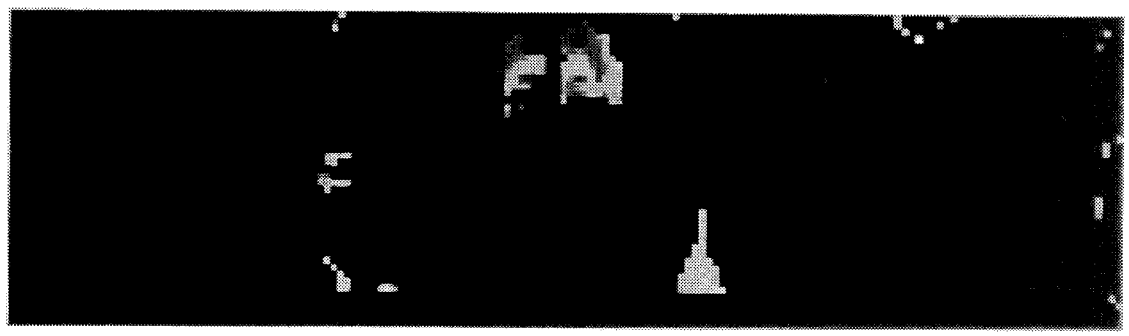
FIG. 6b is a portion of the scene of FIGS. 2a and 2b corresponding to the third peak from the left in the graph of FIG. 5.
Figure 6C:
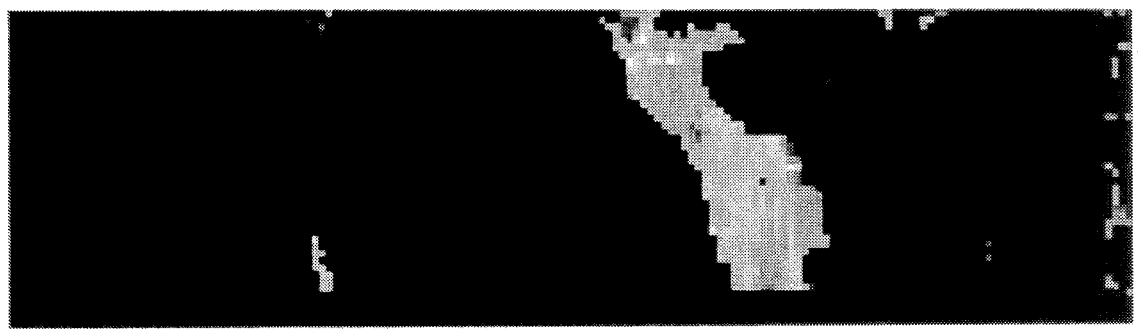
FIG. 6c is a portion of the scene of FIGS. 2a and 2b corresponding to the second peak from the left in the graph of FIG. 5.
Figure 6D:
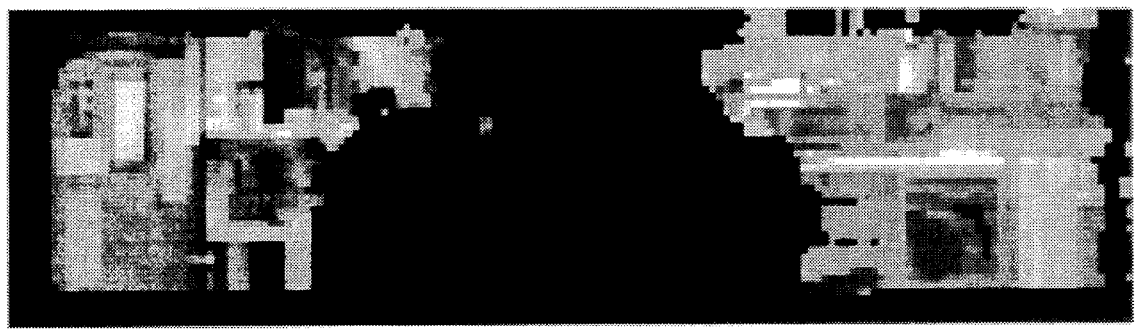
FIG. 6d is a portion of the scene of FIGS. 2a and 2b corresponding to the left-most peak in the graph of FIG. 5.

FIGS. 6a through 6d correlate the depth map of FIG. 3 with the scene of FIGS. 2a and 2b. It will be understood that FIGS. 6a through 6d are presented herein for illustrative purposes and need not be generated in the context of the present invention. FIG. 6a is that portion of the scene appearing at 3.4 to 3.7 feet. FIG. 6b is that portion of the scene appearing at 6.0 to 6.9 feet. FIG. 6c is that portion of the scene appearing at 7.1 to 7.9 feet. Finally, FIG. 6d is the background, that portion of the scene appearing at 11 to 28 feet. The peaks in graph 30 can be correlated to objects in the scene, since for two cameras verged at a distant point, as here, objects closer to the cameras will be offset in the two images more than objects farther away.

Depth graph 30 is preferable to the depth map of FIG. 3, since small camera angle changes (an accidental knock to the cameras) would alter the depth map more than the depth graph, because the scene would change but the depth of the objects present in both the old scene and the new slightly different scene would remain substantially constant relative to the camera location.

In general, peak detection via a depth map as described above may be complicated by the fact that the graph may not go to zero between peaks. The effects of this can be lessened by thresholding the graph at some non-zero value, corresponding to requiring some minimal sized patch of the image to have its best match at each shift. If it was desired to ensure that some real physical object of a certain size was matched at each shift, a variable threshold could be used depending, for a given patch, on the degree of offset between the two images for that object.

In addition, several considerations with respect to the present exemplary embodiment may affect peak detection. The placement of the cameras near some average human eye level may help decrease the misreading of peaks too close together due to people standing too close together in the queue. Also, people are generally not more than about three feet wide from front to back; thus, a somewhat squared peak corresponding to a depth range of more than three feet most likely represents more than one person. Finally, the slopes of the peaks may also be examined to determine whether a given peak is two people or one person. If the pixel count has been falling and suddenly starts to rise again, two peaks are likely present rather than one. This examination of the slope may be necessary, for example, for peaks 38 and 40 if the non-zero thresholding step were not performed.

In the real world, there are often people moving around in the check-out area who are not actually in line but may nonetheless be mistakenly interpreted as such. For example, a person may be standing in a spot a distance directly behind those actually in line. This would result in a large gap between peaks on the depth graph corresponding to the last person actually in line and the person standing a distance therebehind. Thus, any peaks to the left of the gap in such a depth graph should be ignored. As another example, if no one is standing in a location that would normally be considered the beginning of the line, then any peaks should not be considered as people in line. These two steps could be done by a person interpreting the depth graph results or a computer program could be used to filter out the unwanted data from the depth graph.

Figure 7:
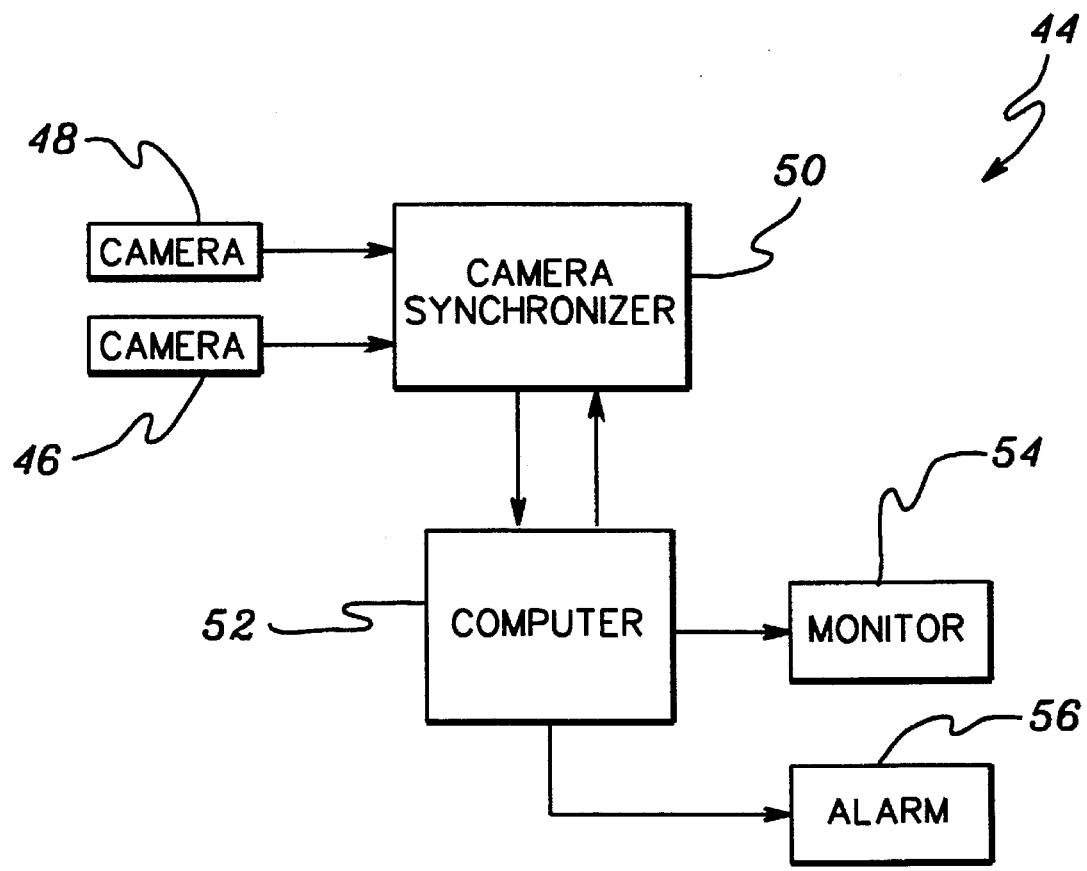
FIG. 7 is a block diagram of an exemplary stereo vision system according to the present invention.

FIG. 7 is a block diagram of the components of an exemplary stereo vision system 44 according to the present invention. Included in system 44 are parallel video cameras 46 and 48, camera synchronizer 50, computer 52, monitor 54 and alarm 56. System 44 may be stand alone or may be connected to a host or network (not shown).

For exemplary purposes, system 44 will be described in the context of counting up to five people in a linear queue starting approximately five feet from cameras 46 and 48 with an expected separation between people of two feet. Cameras 46 and 48 are placed six feet above the floor, have a separation between them of about three inches and are displaced from the center line of the queue by about 18 inches. The cameras are initially manually aligned to make distant background features have almost zero displacement between images of the cameras. The alignment of the background can be "fine tuned" by a program that searches a small number of offsets in the X and Y directions, i.e., across and up and down to find the best match. Each camera has, say, a 30 degree (or about 0.52 radians) field of view. Even pixel lines from one camera are used and odd lines from the other camera are used. Camera synchronizer 50 forces cameras 46 and 48 to scan in a synchronous manner. This ensures that the cameras start and finish scanning the scene including the queue at the same time. Such synchronization could be done, for example, by a "genlock" apparatus, as it is known in the art. Camera synchronizer 50 also reconstructs a single image from the two half images of the cameras. This could be done, for example, by multiplexing the two half images.

The combined stereo video signal is then fed to computer 52, which digitizes same, separates the left and right images and subsamples each to obtain two compressed 100 by 65 pixel images (100 pixels across and 65 up and down). Prior to subsampling or compression, the combined image is 512 by 512 pixels (each half image is 512 pixels across and 256 up and down). Compression extracts, for example, every fifth pixel across and up and down, producing a "fuzzier" but nonetheless satisfactory image. The process of matching patches may take too long (currently, about four minutes) if an image of that detail were used, at least with current speed capabilities. Moreover, it is unnecessary to examine each pixel to obtain fairly accurate results (this implementation in practice had an accuracy of about 90%). Examining more pixels does not increase accuracy, but it would allow for a longer queue, since the clarity of objects farther away would improve.

Although, in the present example, the two images are combined, sent to computer 52 and separated again thereby, it will be understood that the two images could be sent over separate lines to computer 52. The combination and separation are done here for two reasons, the first being to enable the use of a single cable to computer 52. The second reason is that a combined image allows for videotaping thereof which can be reviewed later.

Using the two compressed images, computer 52 computes match scores for all possible 9 by 9 pixel patches at 20 different shifts for each patch. The computer then performs the filtering steps described above. With current off-the-shelf technology, a people count for the queue can be obtained four times each minute. Depending on the length of time an average transaction takes place, for example, one minute, several counts could be averaged to provide even more accuracy in case an error occurs in a given count.

Optionally, alarm 56 may be included in system 44 to indicate that some predetermined number of people in the queue has been reached. In response to the alarm, appropriate action may be taken. Alarm 56 could be, for example, as simple as a light or as complex as a textual message shown on monitor 54.

Although the present implementation is optimized for shorter queues, longer queues of up to 20 people could be counted in a reasonable time using a combination of compressed or low resolution images and high resolution images. For objects farther away, the best match shift number is first found using the low resolution images. This has been found to narrow the field of where to attempt the best match in high resolution. For example, consider a low resolution image having half the number of pixels as a high resolution image in each direction (i.e., one quarter the total number of pixels). If the best match for a given patch in low resolution took place between the third and fourth shifts, the best match in high resolution for that patch area of the scene will likely be between six and eight shifts.

In addition, the present invention is not meant to be limited to people in lines. It could be extended to, for example, cars waiting in a line at toll booths. The only difference would be an increase in the separation between the cameras to account for an increase in the spacing between vehicles versus people, e.g., 20 feet instead of two feet.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

I claim:

1. A method for counting a plurality of objects currently present in a substantially linear queue, comprising:

obtaining a stereo image of a scene including said substantially linear queue from a vantage point area in close proximity to one end of said substantially linear queue, wherein said stereo image comprises a first image and a second image, each of said plurality of objects in said first image being shifted relative to said second image;

obtaining depth information from said stereo image for portions of said scene relative to said vantage point, comprising correlating patches in said first image with patches in said second image; and interpreting said depth information to determine areas of said stereo image substantially corresponding to a given depth range, each of said plurality of objects corresponding to a particular determined area, wherein said step of interpreting comprises:

creating a depth map for said correlated patches, interpreting said depth map to identify one or more regions corresponding to said given depth range, each of said plurality of objects corresponding to one of said one or more regions, and filtering out said depth information for objects in said scene other than said plurality of objects.

2. The method of claim 1, wherein said step of creating a depth map comprises creating a plot of depth frequency for said correlated patches, and wherein said step of interpreting said depth map comprises determining relative peaks in said plot, each of said plurality of objects corresponding to one of said relative peaks.

3. The method of claim 2, wherein said step of filtering comprises:

storing reference depth information for said scene without said plurality of objects therein; and eliminating relative peaks corresponding to said reference depth information.

4. The method of claim 1 wherein said step of filtering comprises filtering out said depth information corresponding to objects in said scene beyond a predetermined depth.

5. The method of claim 4 wherein said step of filtering comprises filtering out said depth information corresponding to objects in said queue beyond said predetermined depth when said depth information indicates an absence of said plurality of objects in a depth range of said substantially linear queue between said one end and said predetermined depth.

6. A method for counting a plurality of objects currently present in a substantially linear queue, comprising:

obtaining a stereo image of a scene including said substantially linear queue from a vantage point area in close proximity to one end of said substantially linear queue, comprising obtaining said stereo image from a pair of video cameras, said stereo image comprising a first image and a second image, wherein said pair of video cameras are separated such that each of said plurality of objects in said first image appears at an offset relative to said second image, wherein said pair of video cameras are parallel such that said offset is horizontal, wherein each said image comprises pixels arranged in rows and columns, and wherein said separation of said cameras is a function of a predetermined maximum length for said substantially linear queue, an expected spacing between each of said plurality of objects, a common field of view for each of said pair of video cameras and a number of pixels in a row of said stereo image;

obtaining depth information from said stereo image for portion of said scene relative said vantage point; and interpreting said depth information to determine areas of said stereo image substantially corresponding to a given depth range, each of said plurality of objects corresponding to a particular determined area.

7. The method of claim 6 wherein said separation is obtained from the following equation:

$$s=(F*d*(d-\delta))/(p*\delta),$$

wherein:

s=said separation of said cameras, in a given linear unit;

F=said common field of view, in radians;

d=said predetermined maximum length, in said given linear unit;

$\delta$=said expected spacing, in said given linear unit; and p=said number of pixels.

8. A method for counting a plurality of objects currently present in a substantially linear queue, comprising:

(a) obtaining a stereo image of a scene including said substantially linear queue from a vantage point area in close proximity to one end of said substantially linear queue, wherein said stereo image comprises a first image and a second image offset from said first image;

(b) initializing a shift counter for counting a number of shifts of said first image relative to said second image;

(c) correlating a patch of predetermined size from said first image with a patch of said predetermined size from said second image to determine a correlation indicator therefor;

(d) storing said determined correlation indicator of step (c) as a maximum indicator for said patch from said first image and storing said initialized shift counter as a corresponding shift indicator for said maximum indicator;

(e) shifting said first image relative to said second image;

(f) incrementing said shift counter;

(g) correlating said patch from said first image with a different patch of said predetermined size from said second image to determine a correlation indicator therefor;

(h) comparing said determined correlation indicator of step (g) with said maximum indicator and replacing both said maximum indicator with said determined correlation indicator of step (g) and said corresponding shift number with said incremented shift counter if said determined correlation indicator of step (g) indicates a greater correlation than said maximum indicator;

(i) repeating steps (e) through (h) for a predetermined number of shifts;

(j) repeating steps (b) through (i) for a predetermined number of different patches from said first image;

(k) creating a plot of depth frequency information, said plot plotting for each possible shift counter number a match indicator indicating a number of maximum indicators with a corresponding shift number equal thereto; and (l) determining relative peaks in said plot, each of said plurality of objects corresponding to a particular relative peak.

9. The method of claim 8 wherein step (k) comprises thresholding said plot at a predetermined minimum match indicator.

10. The method of claim 8 wherein said plurality of objects comprises a plurality of people.

11. The method of claim 10 wherein step (l) comprises determining an elongated relative peak corresponding to more than one of said plurality of people.

12. The method of claim 10 wherein step (k) comprises filtering out said depth frequency information corresponding to objects in said scene other than said plurality of people.

13. The method of claim 12 wherein said step of filtering comprises:

storing reference depth frequency information for said scene without said plurality of people therein; and eliminating relative peaks from said plot corresponding to said reference depth frequency information.

14. The method of claim 12, wherein said step of filtering comprises eliminating relative peaks in said plot corresponding to people beyond a predetermined depth.

15. The method of claim 14, wherein said step of filtering comprises eliminating relative peaks corresponding to people beyond a predetermined depth when no relative peaks indicate a person present within a depth range of said substantially linear queue between said one end and said predetermined depth.

16. The method of claim 10 wherein said vantage point area is angled relative to said substantially linear queue and in close proximity to an average human eye level.

17. The method of claim 8 wherein step (a) comprises obtaining said first image from a first video camera and said second image from a second video camera parallel with and separated from said first video camera by a separation distance.

18. The method of claim 17, wherein each said image comprises pixels arranged in rows and columns, and wherein said separation distance is a function of a predetermined maximum length for said substantially linear queue, an expected spacing between each of said plurality of objects, a common field of view for each of said pair of video cameras and a number of pixels in a row of said stereo image.

19. The method of claim 18, wherein said separation distance is obtained from the following equation:

$$s=(F*d*(d-\delta))/(p*\delta),$$

wherein:

s=said separation of said cameras, in a given linear unit;

F=said common field of view, in radians;

d=said predetermined maximum length, in said given linear unit;

δ=said expected spacing, in said given linear unit; and p=said number of pixels.

20. The method of claim 8, wherein each said image comprises a plurality of pixels arranged in rows and columns, wherein each pixel has a brightness value associated therewith and wherein said correlation indicator is a function of an average brightness for each said patch, a standard deviation for brightness values for each said patch and an average brightness for a theoretical patch of said predetermined size, each pixel in said theoretical patch having a brightness equal to a brightness of a corresponding pixel in each said patch multiplied together.

21. The method of claim 20, wherein each pixel has an X cartesian coordinate and a Y cartesian coordinate, wherein each said patch comprises an h by v pixel patch centered on a pixel with coordinates x, y, said correlation indicator being a score obtained according to the following equation:

$$\text{score}(x,y) = \frac{E_{x,y}(\text{image1},\text{image2}) - E_{x,y}(\text{image1})E_{x,y}(\text{image2})}{\sigma_{x,y}(\text{image1})\sigma_{x,y}(\text{image2})},$$

wherein:

$\sigma_{x,y}(\text{image}X) = [E_{x,y}(\text{image}X^2) - (E_{x,y}(\text{image}X))^2]^{1/2}$ ;

$E_{x,y}(\text{image}X) =$ $$\frac{1}{hv} \sum_{dy=-v/2}^{v/2} \sum_{dx=-h/2}^{h/2} \text{image}X(x+dx, y+dy);$$

$E_{x,y}(\text{image}X^2) =$ $$\frac{1}{hv} \sum_{dy=-v/2}^{V/2} \sum_{dx=-h/2}^{v/2} (\text{image}X(x+dx, y+dy))^2;$$

$E_{x,y}(\text{image1 image2}) =$ $$\frac{1}{hv} \sum_{dy=-v/2}^{v/2} \sum_{dx=-h/2}^{h/2} \text{image1}(x+$$

$dx, y+dy)\text{image2}(x+dx, y+dy);$ and wherein image1 is said first image; image2 is said second image; and imageX is one of said image1 and said image2.

22. Apparatus for counting a plurality of objects currently present in a substantially linear queue, comprising:

means for obtaining a stereo image comprising a pair of images of a scene including said substantially linear queue;

means for correlating patches of said pair of images to determine depths for corresponding areas of said scene relative to said obtaining means;

means for providing depth frequency information for said correlated patches from which said plurality of objects is counted; and means for filtering out said depth frequency information corresponding to portions of said scene other than said plurality of objects.

23. The apparatus of claim 22, wherein said filtering means comprises:

means for storing reference depth frequency information corresponding to said scene without said plurality of objects therein; and means for comparing said provided depth frequency information to said reference depth frequency information.

24. The apparatus of claim 22 wherein said filtering means comprises means for filtering out depth frequency information corresponding to objects in said scene beyond a predetermined depth.

25. The apparatus of claim 24, wherein said obtaining means is located in close proximity to one end of said linear queue, and wherein said filtering means comprises means for filtering out depth frequency information corresponding to objects in said queue beyond said predetermined depth when said depth frequency information indicates an absence of said plurality of objects in a depth range of said substantially linear queue between said one end and said predetermined depth.

26. Apparatus for counting a plurality of objects currently present in a substantially linear queue, comprising:

means for obtaining a stereo image of a scene including said substantially linear queue from a vantage point area in close proximity to one end of said substantially linear queue, wherein said stereo image comprises a first image and a second image, each of said plurality of objects in said first image being shifted relative to said second image;

means for obtaining depth information from said stereo image for portions of said scene relative to said vantage point, comprising means for correlating patches in said first image with patches in said second image; and means for interpreting said depth information to determine areas of said stereo image substantially corresponding to a given depth range, each of said plurality of objects corresponding to a particular determined area, wherein said interpreting means comprises:

means for creating a depth map for said correlated patches, means for interpreting said depth map to identify one or more regions corresponding to said given depth range, each of said plurality of objects corresponding to one of said one or more regions, and means for filtering out said depth information for objects in said scene other than said plurality of objects.

27. The apparatus of claim 26, wherein said means for creating a depth map comprises means for creating a plot of depth frequency for said correlated patches, and wherein said means for interpreting said depth map comprises means for determining relative peaks in said plot, each of said plurality of objects corresponding to one of said relative peaks.

28. The apparatus of claim 27, wherein said filtering means comprises:

means for storing reference depth information for said scene without said plurality of objects therein; and means for eliminating relative peaks corresponding to said reference depth information.

29. The apparatus of claim 27 wherein said filtering means comprises means for filtering out said depth information corresponding to objects in said scene beyond a predetermined depth.

30. The apparatus of claim 29 wherein said filtering means comprises means for filtering out said depth information corresponding to objects in said queue beyond said predetermined depth when said depth information indicates an absence of said plurality of objects in a depth range of said substantially linear queue between said one end and said predetermined depth.

* * * * *